May 28, 1963
O. ARONSON
3,091,137
DRILLING AND TAPPING MACHINE
Filed Nov. 7, 1960
2 Sheets-Sheet 2
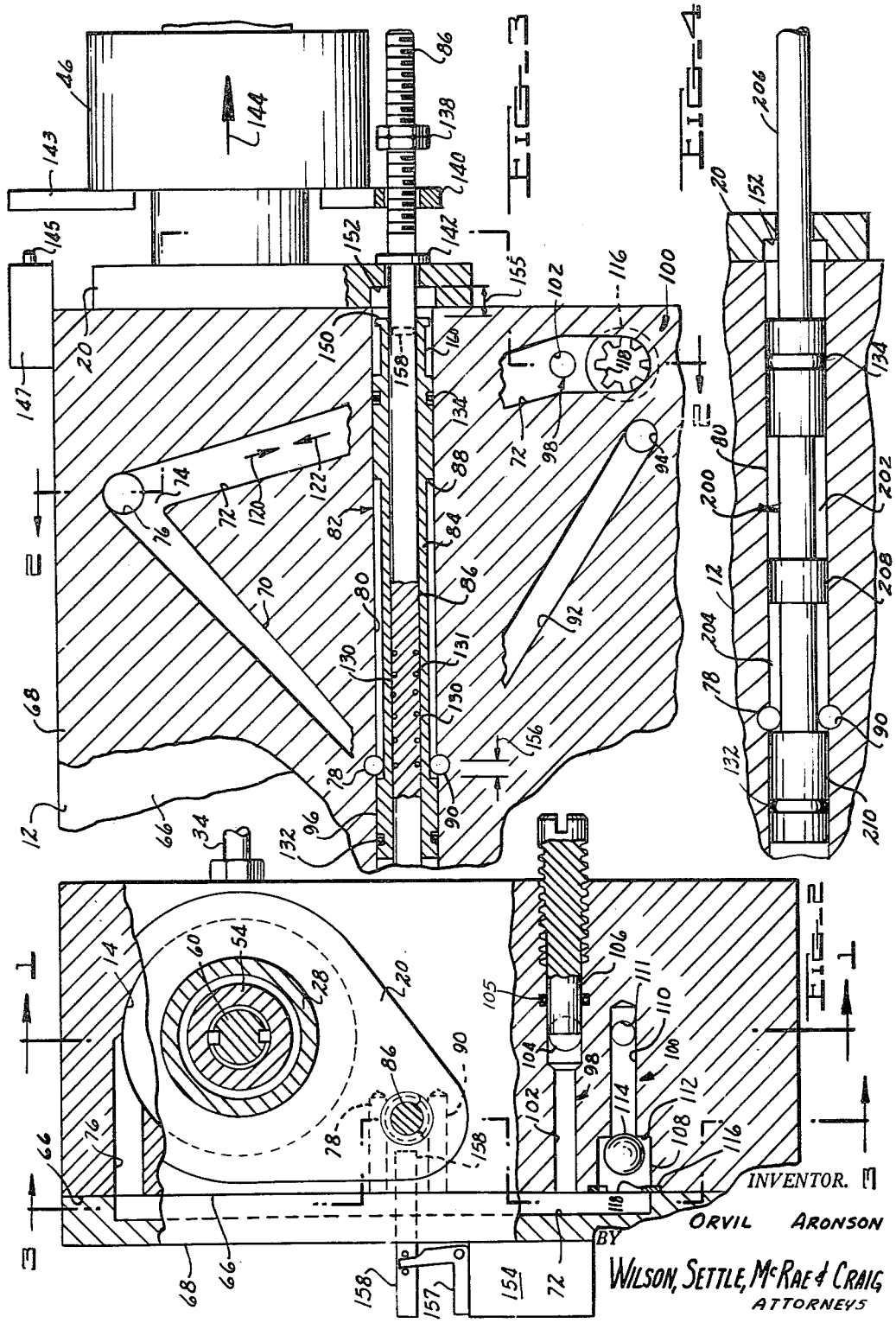
INVENTOR.
ORVIL ARONSON
BY WILSON, SETTLE, McRAE & CRAIG
ATTORNEYS United States Patent Office 3,091,137
Patented May 28, 1963

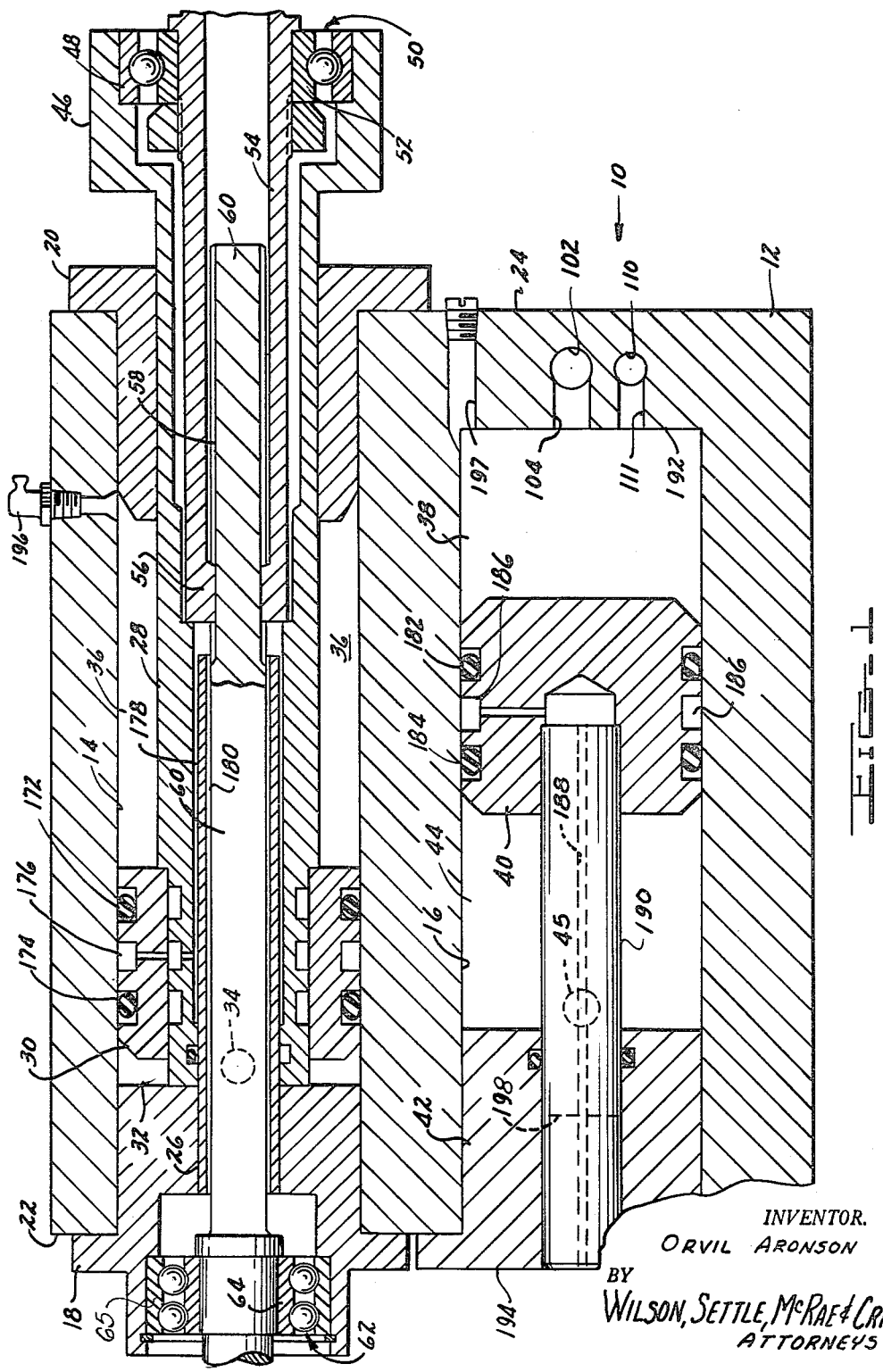

3,091,137
DRILLING AND TAPPING MACHINE
Orvil Aronson, 34 Newberry Place,
Grosse Pointe 36, Mich.
Filed Nov. 7, 1960, Ser. No. 78,199
15 Claims. (Cl. 77—32.3)

This invention relates to a controlled power device, as for example a power device adapted to power and control the stroke of a cutting tool such as a drill or tap.

In automatic machine tool operations, particularly drilling operations with small diameter drills, it is of major importance to feed the cutting tool at a rapid rate prior to its entry into the work, to stroke the tool at a slower controlled rate while it is cutting, and to withdraw the tool from the work at a rapid rate. In many instances best chip disposal and coolant application are greatly facilitated by periodically withdrawing the tool from the work before it has proceeded to its full depth in the work; in such instances it is therefore desirable to feed the tool toward the work at a rapid rate, then cut into the work a required depth (e.g. one half to four tool diameters) at a slower controlled rate, then retract the tool out of the work at a rapid rate, then feed the tool back toward the work at a rapid rate until the tool tip is just short of its previous point of furthest advancement, then feed the tool into the new portion of the work at a slower controlled rate for a required depth, then rapidly retract the tool out of the work, and so on until the tool has cut through the work or reached its desired full depth therein. The above operations are generally referred to in the art as "peck feed" operations; i.e. the tool pecks at the work until the cutting operation is complete. The terms "rapid" and "slower" as employed in a description of this operation are employed only in a relative sense, since in an absolute sense the movements may be quite fast. In an illustrative case each complete stroke (i.e. rapid feed plus slow cutting feed plus rapid retraction) might be completed in approximately two seconds or less.

With the above discussion in mind, one object of the present invention is to provide a "peck feed" power unit having the desired features of low cost, relatively small size, and accurate control of the stroke during each of its instantaneous motions.

A further object of the invention is to provide improved simplified hydraulic metering and check valve components necessary in a power unit of the above type, such components being particularly designed for the attainment of the multiple objective of flow control accuracy, clog-free performance, long service life, and low production cost.

An additional object of the invention is to provide a power unit having a hydraulic control component which functions without need of a sump such as required with certain of the prior art devices.

A further object of the invention is to provide a power unit having a hydraulic control component wherein special means is utilized to prevent air or other gas from becoming entrapped in the hydraulic fluid.

Another object is to provide a power unit which may be utilized in a horizontal position, vertical position or any tilted position.

A further object is to provide a power unit having a hydraulic cylinder volume which varies with the amount of liquid available to it, whereby control of the unit is maintained even in the event of liquid losses.

An additional object is to provide a power unit having a hydraulic component with special means for indicating the state of fill of the component at all times.

A further object is to provide a power unit having a hydraulic component which functions even after partial loss of fluid, as by leakage.

Other objects of this invention will appear in the following description and appended claims, reference being had to the accompanying drawings forming a part of this specification wherein like reference characters designate corresponding parts in the several views.

In the drawings:

FIG. 1 is a sectional view of one embodiment of the invention taken substantially on line 1—1 in FIG. 2.

FIG. 2 is a sectional view taken substantially on line 2—2 in FIG. 3.

FIG. 3 is a sectional view taken substantially on line 3—3 in FIG. 2.

FIG. 4 is a sectional view illustrating a control device which may be employed in the FIG. 1 units as an alternate to the control device shown in FIG. 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, and particularly FIG. 1, there is shown a power unit 10 for a drilling machine, said unit comprising a generally flat-faced rectangular block 12 having a cylindrical bore 14 extending completely therethrough and a cylindrical bore 16 extending partially therethrough. Bore 14 is closed at its opposite ends by suitable annular caps 18 and 20 appropriately bolted to the end faces 22 and 24 of block 12 by bolts (not shown). In the illustrated embodiment cap 18 fixedly mounts a steel tube 26, as by a press fit relationship. The tube is located within a longitudinally slidable quill 28; however tube 26 does not bear any appreciable load because the quill carries a piston 30 which bears on the wall of bore 14.

The space 32 between piston 30 and cap 18 is intended to alternately receive air from and exhaust air to an air line 34, depending on the direction desired to be taken by piston 30. The space 36 between piston 30 and cap 20 contains hydraulic liquid for providing a controlled retarding dashpot action on the piston in opposition to the action of the air pressure in space 32.

As will be explained hereinafter, a passage system is provided so that annular space 36 is put into limited fluid communication with cylinder space 38 located to the right of piston 40. The arrangement is such that introduction of pressurized air into space 32 (FIG. 1) is effective to drive piston 30 to the right, with a resultant exhaustion of hydraulic fluid from space 36 into space 38. The hydraulic pressure thus developed to the right of piston 40 drives said piston to the left in bore 16 toward a cap 42 which is suitably bolted onto face 22 of block 12. The space 44 between piston 40 and cap 42 connects with an air line 45, FIGURE 1, which is suitably mounted in block 12, the arrangement being such that leftward movement of piston 40 is effective to direct air from space 44 into line 45. Air line 45 and the previously mentioned air line 34 connect to a conventional four way electrical valve (not shown), the four legs of which connect respectively with a pressurized air supply, lines 34 and 45, and a vent line. The hook-up is such that in one position of the valve element (solenoid energized for example) line 34 communicates with the pressurized air supply, and line 45 communicates with the vent, and in the other position of the valve element (solenoid de-energized for example) line 45 communicates with the pressurized air supply and line 34 communicates with the vent. By the described arrangement spaces 32 and 44 are alternately supplied with pressurized air for thereby powering pistons 30 and 40 in opposing directions.

The cycle is such that introduction of pressurized air into space 32 powers piston 30 to the right and piston 40 to the left; introduction of pressurized air into space 44 powers piston 40 to the right and piston 30 to the left.

As previously noted, piston 30 is carried on a longitudinally slidable quill 28, the right end portion 46 of which is enlarged to mount the outer race 48 of an anti-friction bearing assembly 50. The inner race 52 of the bearing assembly is carried on a rotary hollow spindle 54 which is internally enlarged at its left end to define one or more splines 56 (FIG. 1). These keys slidably interlock in longitudinal splineways 58 formed in the outer surface of a rotary shaft 60, the left end portion of which is supported by an anti-friction bearing assembly designated generally by numeral 62. As shown in FIG. 1 assembly 62 comprises an inner race 64 suitably secured to shaft 60 and an outer race 65 suitably secured to fixed cap 18. It will be seen that the two axially spaced bearing assemblies 50 and 62 support the shaft-spindle assembly 60, 54 at two widely spaced points for conjoint rotary movement. The widely spaced points of support are very advantageous in preventing wear and insuring a long service life.

Power for developing the rotary movement may be derived from an electric motor (not shown) suitably connected to the left end portion of shaft 60, either by direct drive or by conventional belt-pulley means (not shown). When the belt-pulley arrangement is used the motor is preferably located above the upper face 66 of block 12 in order not to unduly elongate the power unit in the axial direction.

As will be seen from FIG. 1, spindle 54 is interlocked in an axial sense to quill 28 by the bearing assembly 50. Therefore, when pressurized air is introduced into space 32 there is a resultant rightward axial displacement of quill 28 and spindle 54. The rotary motive power for spindle 54 may, as previously noted, be obtained via an electric motor, shaft 60, and the spline means at 56, 58. Shaft 60 of course moves only rotationally without axial displacement. In actual use of the illustrated power unit in a drilling machine a drill-gripping chuck (not shown) is installed on the right end of spindle 54.

At a previous point herein reference has been made to the fluid communication between cylinder spaces 36 and 38. The details of the fluid communication are best shown in FIGS. 2 and 3 wherein face 66 of block 12 serves as a mounting surface for a manifold plate 68. Suitable bolts (not shown) may be provided for securing the manifold plate onto block 12.

The manifold plate is formed with two grooves 70 and 72 which extend obliquely from a common groove portion 74, FIGURE 3. Groove portion 74 registers with a machined passage 76 extending from the upper right end portion of bore 14 so that in operation rightward movement of piston 30 (FIG. 1) causes hydraulic fluid to be flushed through passage 76 to grooves 70 and 72.

As will be appreciated from a study of FIGS. 2 and 3, the lower end of groove 70 registers with a passage 78 which is machined from face 66 into block 12 so as to communicate with an elongated bore 80. Preferably bore 80 extends completely through block 12 from face 22 to face 24 thereof. It will be seen from FIG. 3 that in bore 80 there is mounted a sleeve-shaft assembly generally designated by numeral 82. This assembly comprises a sleeve or spool 84 and a shaft or stem 86. Both the shaft and stem are constructed to slide within bore 80 when subjected to axial mechanical forces to be described hereinafter.

It will be noted that sleeve 84 is provided with a peripheral groove 88. When the sleeve is positioned with this groove in registry with passage 78 (as in FIG. 3) the groove furnishes a path for flow of hydraulic fluid between passage 78 and a passage 90 extending outwardly to face 66 of block 12. Passage 90 registers with the upper end portion of a fluid channel or groove 92 formed in the inner face of plate 68. The lower end portion of groove 92 communicates with a passage 94 extending from face 66 of block 12 into the right end portion of bore 16.

From the above discussion it will be seen that when sleeve 84 is located with groove 88 thereof in registry with passages 78 and 90 there is formed a path for flow of hydraulic fluid between the right end portions of bores 14 and 16. The complete path is defined by the various duct areas denoted by numerals 76, 70, 78, 80, 90, 92 and 94. When sleeve 84 is adjusted to position barrel portion 96 thereof in registry with passages 78 and 90 the communication across duct areas 70 and 92 is halted.

Referring once again to groove 72 (FIG. 3), the lower end area thereof communicates with two passage mechanisms referred to herein by the numerals 98 and 100. Passage mechanism 98 is defined by a passage 102 which extends at right angles inwardly from block face 66 into communication with a passage 104 extending axially from the right end of bore 16.

As will appear from FIG. 2 the right end area of bore 102 is threaded to meshingly receive the threads of a manually adjustable stem 106. An O-ring 105 may be provided to seal the joint between stem 106 and the bore. The left tip area of stem 106 may be located as shown in FIG. 2 to partially overlap passage 104 and thereby change its effective area. It will be understood that leftward adjustment of the stem reduces the effective area of passage 104, and rightward adjustment of the stem increases the effective area of passage 104. This passage serves as a metering means for metering the flow of hydraulic fluid to bore 16 (particularly when flow between passages 70 and 92 is interrupted), and the adjustment of stem 106 is therefore of importance in determining the rate at which liquid is introduced into bore 16. As will be understood, the rate at which liquid is introduced to bore 16 is determinative of the speed of piston 30 during its rightward movement. Proper adjustment and operation of stem 106 is therefore important to most satisfactory performance of the power unit.

Referring to FIG. 3, washer 116 is formed with a series of internally directed prongs or arms 118 which function to limit leftward movement of ball 114 (FIG. 2) and locate same centrally within the passage 108 side walls. The spaces between adjacent prongs serve as flow spaces for receiving liquid from the area surrounding the ball when the ball is located against the washer prongs. It will be seen that ball 114 serves as a check valve to allow liquid to flow from passage 110 into passage 108 but to prevent flow from passage 108 into passage 110. The design of washer 116 is such as to give a very satisfactory liquid flow without clogging, cocking, fluttering or other malfunctioning such as sometimes occurs with conventional spring-urged check valve constructions. As will be apparent from the drawings the check valve assembly is very low in cost and requires very little installation space.

Referring again to FIG. 3, it will be seen that grooves 70 and 72 provide two separate flow paths for liquid from passage 76. As previously noted, flow through groove 70 is controlled by the position of sleeve 84. Flow of liquid through groove 72 is controlled by check 114 and stem 106; i.e. flow in the arrow 120 direction is restricted to a predetermined relatively slow rate by the adjusted size of orifice 104, and faster flow in the arrow 122 direction is permitted to take place past check 114 with some added flow through orifice 104 into passage 102.

The flow of fluid through the FIG. 3 passage system is derived from the motion of the pistons 30 and 40 as they are driven by the pressurized air as previously described. Thus, as the air pressure is increased in space 32 (FIG. 1) piston 30 is forced to the right so as to flush liquid from space 36 into passage 76 and grooves 70, 72. Assuming that at the beginning of the stroke groove 88 is in registry with bores 78 and 90, then a substantial flow of liquid will be driven through groove 70 and ultimately into bore 16 via duct 94; some liquid will be introduced to bore 16 via groove 72 and passage 104. If now the sleeve 86 is adjusted axially to close passage 78 the flow of liquid into bore 16 will be substantially reduced to a lower controlled value, i.e. all of the flow will be restricted to metering passage 104. As will be explained hereinafter, sleeve 84 is automatically adjusted during the stroke of piston 30 to initially permit a rapid transfer of liquid from bore 14 to bore 16 for providing a rapid tool movement toward the work, and to thereafter restrict the liquid flow from bore 14 to bore 16 for providing a slower tool movement during the cutting period. The transfer of liquid to bore 16 will drive piston 40 to the left.

Rightward movement of piston 40 (by introduction of pressurized air into space 44) flushes large quantities of liquid from space 38 into passage 111, thence past ball 114, and into groove 72, from where it is delivered to bore 14. Some liquid flows to bore 14 via the metering passage 104. During part of the stroke passages 78 and 90 are opened to permit added liquid transfer from bore 16 to bore 14; however passages 110 and 108 are sized sufficiently large to accommodate a relatively fast liquid flow during the entire rightward movement of piston 40. This movement of course powers piston 30 to the left (by hydraulic pressure in space 36) so as to withdraw the drill or other cutting tool from the work. The movement is preferably very rapid, e.g. a three inch leftward travel of piston 30 in about one second or less.

Control of the piston stroke may be effected by the sleeve-shaft assembly 82 shown in FIG. 3. As there shown, shaft 86 of the assembly is provided with a plurality of peripheral grooves 130, each containing a rubber O-ring 131 which frictionally engages the inner surface of sleeve 84. By this arrangement the shaft 86 and sleeve are frictionally interlocked together for conjoint axial displacement during at least a portion of the stroke.

Sleeve 84 is provided with sealing O-rings 132 and 134 which frictionally engage the bore 80 surface. However this frictional engagement is designed to be less than that of the previously described O-rings 131 so that sleeve 84 is under certain circumstances capable of a sliding motion in bore 80 when an axial pull or push is exerted on shaft 86. Rightward displacement of sleeve 84 is limited by surface 152 on the inner face of fixed cap 20, but shaft 86 is free to slide to the right after the sleeve has contacted surface 152.

Shaft 86 is threaded on its right end area to adjustably mount a nut 138 which constitutes an abutment member adapted to be forcibly engaged by an arm 140 carried on the axially travelling head 46 during the rightward stroke of piston 30 (FIG. 1). A second abutment is formed on shaft 86, as by means of a conventional tru-arc ring 142.

The start of the stroke in the arrow 144 direction begins with arm 140 engaged with abutment member 142, and with shaft 86 and sleeve 84 in their illustrated positions. During the initial portion of the stroke the shaft 86 and sleeve 84 are both motionless, and hydraulic fluid is being flushed rapidly from bore 14 to bore 16 via the grooves 70 and 72. When head 46 strikes abutment nut 138, shaft 86 and sleeve 84 are then both driven in the arrow 144 direction. As the sleeve-shaft assembly is propelled to the right the passages 78 and 90 are automatically closed by valve-forming barrel portion 96 so that liquid is then restricted to flow only in groove 72 and the metering passage system. The thus slowed rate of liquid flow acts to retard the rapid travel of piston 30 to the right, and the stroke of the cutting tool is thus accurately controlled at a safe relatively slow constant value by valve 106. The parts are so constructed and adjusted that before the conclusion of the rightward stroke end surface 150 of the sleeve strikes surface 152; by this action shaft 86 advances to the right relative to sleeve 84.

The device is initially adjusted so that on the rightward stroke the tool enjoys its slow controlled movement from a position just prior to entering into the work; before that time it is fed rapidly as above noted. Preferably an electrical timer means (not shown) is provided for limiting the stroke in the arrow 144 direction (i.e. the timer controls the electrical valve which controls the air introduction to space 32). The timer is set for a predetermined period of signal duration, as for example two seconds. The rapid feed portion of the forward motion takes place in a short period of time, as for example one-fourth second, and the remaining time is taken up by the controlled feed cutting portion. In a given situation the rapid feed portion might proceed for two inches and the controlled feed portion might proceed for one or two tool diameters, after which the timer would reverse the tool back out of the work to its initial position. With the illustrated arrangement the tool has a different total travel on each stroke, but the cutting length per stroke may be substantially the same for each stroke because the non-cutting periods take up so little of the time in a relative sense.

On reverse or retractive movement of the tool (pressurization of space 44) liquid is free to flow rapidly from space 38 to space 36 via passage 108 and groove 72. At the beginning of such retractive movement abutment member 142 is located in spaced relation to the right face of cap 20 so as to be in the path of travel of arm 140. As the arm strikes abutment member 142 assembly 82 is driven to the left until member 142 strikes member 20. As the leftward movement is completed an arm 143 on head 46 contacts the actuator button 145 for conventional electrical switch 147. Switch 147 is suitably interlocked with the timer so as to insure that it will be synchronized with the piston stroke, i.e. switch 147 is in the timer-energizing relay circuit so that each timer period begins at the same point in the piston stroke. This arrangement prevents slight errors in each piston stroke from adversely affecting the entire cycle.

Preferably the initial spacing 155 (FIG. 3) between the right end face 150 of sleeve 86 and surface 152 of fixed member 20 is chosen to be something greater than the sleeve movement distance 156 required to appreciably close or restrict passages 78 and 90; the difference between the two distances may be approximately .025 inch in a given situation. The purpose of this differential distance feature is to ensure that the tool has a rapid feed rate until just prior to its entry into the work. Thus, during the outward stroke, when member 140 strikes member 138 sleeve 84 initially moves through distance 155, after which the passages 78 and 90 are closed. The assembly including sleeve 84 is thereby then moved at a slower rate until surface 150 strikes surface 152, at which time the tool preferably begins cutting into the work. During the cutting period sleeve 84 is restrained by surface 152 against axial movement, but shaft 86 is drawn to the right a distance corresponding to the depth of cut during the stroke. After the tool has completed its cutting stroke (under timer control), the head 46 reverses its motion so that arm 140 strikes abutment member 142 to thereby drive assembly 82 to the left as previously noted.

During the initial outward stroke sleeve 84 moves through distance 156, and shaft 86 moves through distance 155 plus the length of the cutting stroke. During the reverse stroke both sleeve 84 and shaft 86 move through the length of the cutting stroke plus distance 155, FIGURE 3. Thus in an absolute sense each complete reciprocation of the tool displaces sleeve 84 leftwardly on shaft 86 a distance corresponding to the length of the cutting stroke; each complete tool reciprocation produces no absolute displacement of shaft 86.

Each complete reciprocation of the tool causes sleeve 84 to be displaced to the left on shaft 86 so that when the last tool reciprocation begins the right end area of groove 88 may register with ducts 78 and 90. The groove is therefore constructed as an elongated groove as shown in the drawing.

The absolute displacement of sleeve 84 is such that on each succeeding out stroke the tool has a rapid feed until just prior to engagement with the work irrespective of the depth of the hole prior to each cut. A suitable limit switch (not shown) may be provided to determine the final depth of the hole. The axial length of each cut may be determined by the timer and by adjustment of metering stem 106.

The limit switch may be utilized to energize a solenoid 154 which is provided with an armature formed as part of a bell crank 157. The crank suitably connects with a slidable latch bar 158 arranged to move toward sleeve 84. On energization of the solenoid latch bar 158 is projected into a groove 160 formed in sleeve 84 so as to restrict leftward movement of the sleeve and thereby reset the mechanism for further operations.

The FIG. 3 assembly 82 provides a "peck feed" movement to the cutting tool. In certain instances (as in the drilling of radial holes in tubular stock) it is desired to provide a so called "skip feed" movement wherein the tool advances rapidly toward one work body wall, then at a slower controlled rate through the body wall, then at a faster rate to a position closely adjacent another work body wall, and then at a slower controlled rate through this work body wall. In the drilling of holes in tubular stock by skip feed methods the tool is advanced rapidly to one wall, then slowly through the wall, then rapidly within the tubular stock across to the other wall, and thence slowly through the other wall.

A suitable skip feed control is shown in FIG. 4, wherein a one piece rod structure 200 replaces the aforementioned assembly 82. The rod structure is formed with two peripheral grooves 202 and 204, and an extension 206 which is suitably connected to the head 46 (shown in FIG. 3) by nut means (not shown).

In operation the stroke is begun with structure 200 displaced to the left from its illustrated position such that groove 202 registers with ducts 78 and 90. The tool begins its rightward movement with a rapid feed until barrel portion 208 substantially closes duct 90 to duct 78, whereupon the feed is slowed to a controlled rate (for cutting). When groove 204 uncovers the ducts 78 and 90 the feed is again rapid (for advance to the next work material wall), and when barrel portion 210 closes duct 90 the feed is again slowed to a controlled rate (for cutting). The total length of feed can be suitably controlled by timer means or limit switches, and the return or retracting stroke can be a rapid stroke, as by utilizing the passage 100 as previously described. The linear lengths of the various forward rapid movements and slow movements are of course determined by the lengths of the various grooves 202 and 204 and barrel portions 208 and 210. The number of grooves and barrel portions may of course be chosen and varied in accordance with the particular job requirements.

It will be understood that proper operation of the illustrated power unit requires that no air or other gas be entrained or mixed with the oil or other liquid in the liquid portion of the unit. In the illustrated embodiment special provision is made to prevent gas or liquid from passing around piston 30 or piston 40 to the other fluid media. Thus piston 30 is provided with two separate resilient deformable O-ring seals 172 and 174, and a vent passage 176 therebetween. The vent passage communicates with an elongated annular passage 178 which in turn communicates with an elongated annular passage 180 leading to atmosphere through the bearing assembly 62. By the described arrangement any liquid or gas which may escape past seal 172 or 174 is vented to the atmosphere before it can have an opportunity to seep past the remaining seal and into the other media. The pressures within spaces 32 and 36 are of course higher than the pressure within the vent passage so as to provide the desired vent action. Piston 40 is provided with two sealing rings 182 and 184, together with a vent passage 186 which discharges to atmosphere through a passage 188 formed in rod 190 for piston 40.

Rod 190 serves both as a means for preventing any cocking of piston 40 and also as a gage element for denoting the amount of liquid at any time within the liquid portion of the system. It may be here noted that all liquid systems of the piston-cylinder type eventually lose liquid through the piston-cylinder joints. However the illustrated unit is so constructed that a considerable loss of liquid can be tolerated without deleterious results. In this connection it will be seen that piston 40 can occupy various starting positions without affecting the stroke of the tool-driving piston because the cross sectional area of cylinder 16 is much greater than the cross sectional area of annular space 36. Thus piston 40 may be started from a location adjacent cylinder end wall surface 192 without interfering with the piston action. In other words, the entire system is a variable volume system which automatically functions in the desired manner in spite of variations in the amount of liquid available to it.

Differences in starting position of piston 40 could result from loss of liquid out of the system, and such differences in starting position are indicated by the position of rod 190 relative to the external face 194 of cap 42. The liquid system may be initially charged and air bled through various passages illustratively shown in the drawing by numerals 196 and 197. The charging is continued until the left end of rod 190 is flush with face 194, and any operational losses of liquid may be detected by periodically observing the extent to which rod 190 is displaced when head 46 is in its retracted position. Displacement of the left end of rod 190 more than a predetermined distance inwardly from surface 194 indicates the need for refilling with liquid. In the illustrated embodiment the safest displaced position is denoted by numeral 198.

It will be appreciated that with the illustrated arrangement there is no need for a separate liquid sump since the entire liquid system is self contained within the illustrated structure. As above noted, the operating volume automatically varies in accordance with the available quantity of liquid present therein. The various components are designed for flow control accuracy, long service life, clog-free performance, and best working action. In this connection it will be seen that by utilizing the piston 30 with pressure liquid and pressure gas on its opposite faces both the feeding and retracting forces are applied directly along the axis of the cutting tool so that no objectionable moment arm forces are set up between the tool carrying member and force application point; this results in a generally better overall performance than would otherwise be possible.

The drawings show particular features of construction and arrangement but it will be appreciated that variations may be resorted to without departing from the spirit of the invention as set forth in the appended claims.

I claim:

1. A power unit comprising two fluid cylinders; a piston in each cylinder subdividing same into a fluid space and a liquid space; passage means between the liquid spaces for causing powered movement of one piston by fluid pressure to effect movement of the other piston by hydraulic pressure, and vice versa; and piston-synchronized control means comprising a sleeve-shaft assembly movable as a unit for a predetermined distance to throttle fluid flow through the passage means from a relatively high rate to a relatively low controlled rate; the shaft in said assembly having a frictional fit within the sleeve, and the drive for the assembly being taken through the shaft so that after the assembly has throttled the flow the shaft may be propelled along the sleeve to assume a new position thereon in accordance with the length of the piston stroke.

2. The combination of claim 1 wherein the friction fit is provided by resilient O-ring means carried on the shaft in frictional engagement with the sleeve.

3. The combination of claim 1 wherein the passage means comprises two spaced ducts and a groove formed in the peripheral surface of the sleeve, said ducts both communicating with the groove in one position of the sleeve, and at least one of the ducts being sealed from the groove in another position of the sleeve.

4. The combination of claim 1 wherein the passage means comprises a first small cross section metering passage, a larger cross section rapid feed passage, and a third relatively large one way flow passage; said first, second and third passages being arranged in parallel flow relationship with one another, and the sleeve-shaft assembly having a path of movement for controlling flow only in the second passage, said sleeve-shaft assembly having a lost-motion connection with one of the pistons so that said one piston is enabled to (1) initially move at a high rate with a large volumetric liquid transfer through the first and second passages, (2) move the sleeve-shaft assembly as a unit to close the second passage and thereby confine liquid flow to the first metering passage, with consequent retardation of the piston movement, and (3) move in a reverse direction at a rapid rate by flushing liquid at a high rate through the third passage.

5. A liquid flow control unit comprising a fixed hollow guideway; a sleeve slidably disposed within the guideway; a shaft having a frictional fit within the sleeve and extending outwardly beyond the guideway; a shoulder-forming element on a portion of the shaft located beyond the guideway; power means having a portion thereof traversing the formed shoulder during power means movement; a groove in the sleeve; fluid passage means fixedly related to the guideway and intersecting the groove in one position of the sleeve; and a stop structure limiting slidable movement of the sleeve in at least one direction.

6. The combination of claim 5 wherein the sleeve movement required to close the passage means from the groove is less than the distance between the sleeve and stop structure when the sleeve is located with the groove thereof just out of registry with the passage means.

7. The combination of claim 6 and further comprising electrically operating means operable to hold the sleeve against movement while having no retarding effect on the shaft, whereby the shaft may be periodically automatically adjusted to a predetermined location within the sleeve.

8. In a variable volume power unit having a housing, first and second bores in said housing defining first and second cylinders, each of said cylinders having first and second ends, pistons mounted for longitudinal movement in each of said cylinders, means connected to the first end of said first cylinder to admit a compressed gas and drive the piston toward said second end of said first cylinder, means connecting the second ends of said cylinders in hydraulic fluid transfer relationship to define a hydraulic circuit, and means connected to the first end of said second cylinder to admit a compressed gas to bias said second piston against the hydraulic fluid of said hydraulic circuit, the improvement wherein each of said pistons is provided with axially spaced fluid seals adapted to weep gas faster than liquid, and an atmospheric vent between said seals adapted to receive weeping gas and fluid therefrom whereby the hydraulic circuit is retained free of void space and functions automatically in accordance with varying quantities of hydraulic fluid therein.

9. In a power feed unit for a drilling machine including a first cylinder having first and second ends and a piston slidably mounted within the cylinder, the piston carrying a quill and the quill carrying a rotatable tool-holding spindle, the quill and spindle being reciprocable with the piston, and means for driving the piston of the first cylinder in one direction, the improvement of a second cylinder, said second cylinder having a piston mounted for reciprocation therein, hydraulic conduit means connecting one end of said second cylinder and one end of the first cylinder to define a closed hydraulic system, hydraulic fluid in said hydraulic system, each of said pistons being provided with axially spaced fluid seals adapted to weep liquid and gas during movement of the piston, and an atmospheric vent between said seals adapted to receive weeping gas and fluid therefrom and means biasing said second piston against the hydraulic fluid whereby the hydraulic system is retained free of void space and functions automatically in accordance with the available quantity of fluid therein.

10. In a power feed unit for a drilling machine including a first cylinder having first and second ends and a piston slidably mounted within the cylinder, the piston carrying a quill, the quill carrying a rotatable tool-holding spindle, the quill and spindle being reciprocable with the piston, and conduit means connected to the first end of the first cylinder for admitting compressed gas to the cylinder to drive the piston in one direction, the improvement of a second cylinder, said second cylinder having a piston mounted for reciprocation therein, a piston rod on said second piston extending out of said second cylinder, hydraulic conduit means connecting one end of said second cylinder and the second end of the first cylinder to define a closed hydraulic circuit, hydraulic fluid in said hydraulic circuit, and means biasing said second piston against the hydraulic fluid whereby the hydraulic circuit is retained free of void space, the hydraulic system functions automatically in accordance with the available quantity of hydraulic fluid in the system, and said piston rod functions as a gauge indicating the quantity of hydraulic fluid in said hydraulic circuit.

11. In a hydraulic control system, a housing defining a pair of cylinders, pistons in each of said cylinders, one side of each of said pistons being exposed to gas and the other side of said pistons being exposed to liquid, conduit means connecting the liquid sides of said pistons in a closed liquid system of controlled flow, said pistons having spaced seals thereon with an atmospheric vent therebetween, said seals being adapted to weep gas faster than liquid during movement of said pistons in said cylinders, and said atmospheric vent being adapted to receive gas and liquid bleeding past said seals.

12. In a hydraulic control system, a housing defining two fluid cylinders, a piston in each cylinder subdividing the same into a gas space and a liquid space, liquid conduit means connecting the liquid spaces to provide a closed liquid circuit for controlling piston movement, said pistons having axially spaced seals thereon with an atmospheric vent therebetween, said seals being adapted to weep gas faster than liquid upon movement of said pistons in said cylinders and said atmospheric vent being adapted to receive gas and liquid bleeding past said seals, said liquid conduit means including a small cross section slow feed passage and a larger cross section rapid feed passage, and valve means operated in synchronism with movement of the pistons for closing the rapid feed passage during a portion of the piston stroke.

13. In an automatic self-bleeding hydraulic control system, a cylinder, a piston slidable in said cylinder, axially spaced seals positioned between said piston and said cylinder and being adapted to weep gas more rapidly than liquid, and an atmospheric vent between said seals and adapted to receive fluid weeping past said seals.

14. In an automatic self-bleeding hydraulic control system, a cylinder, a piston slidable in said cylinder, axially spaced seals on said piston engageable with said cylinder in slidable relation, said seals being adapted to weep gas at a more rapid rate than liquid on movement of said piston in said cylinder, and an atmospheric vent between said seals adapted to receive gas weepage from said seals, thereby keeping said hydraulic system free of accumulated gas.

15. In a method of forming an automatic self-bleeding hydraulic control system having a fluid cylinder and a piston movable in said cylinder, the steps of providing axially spaced seals on said piston and an atmospheric vent therebetween, placing liquid on one side of said cylinder and gas on the other side, and maintaining the liquid at least at atmospheric pressure whereby gas accumulating in said liquid is ejected past said seal to said atmospheric vent to automatically de-gas the liquid system during operation thereof.

References Cited in the file of this patent

UNITED STATES PATENTS

| | | |
|---|---|---|
| 706,688 | Reynders | Aug. 12, 1902 |
| 2,674,138 | Mize | Apr. 6, 1954 |
| 2,733,691 | Johnson | Feb. 7, 1956 |
| 2,922,323 | Weidner | Jan. 26, 1960 |